US00RE36829E

United States Patent [19]

Blanche

[11] E Patent Number: Re. 36,829

[45] Reissued Date of Patent: Aug. 22, 2000

[54] BRIDGED ELECTRICAL PLUG

[75] Inventor: Stephen A. Blanche, Warwick, R.I.

[73] Assignee: ETCO Incorporated, Warwick, R.I.

[21] Appl. No.: 08/703,971

[22] Filed: Aug. 28, 1996

Related U.S. Patent Documents

Reissue of:

[64] Patent No.: 5,411,403
Issued: May 2, 1995
Appl. No.: 08/252,679
Filed: Jun. 2, 1994

[51] Int. Cl.[7] ..... H01R 19/08

[52] U.S. Cl. ..... 439/106; 439/695

[58] Field of Search ..... 439/106, 695, 439/696, 606, 236

[56] References Cited

U.S. PATENT DOCUMENTS

| | | | |
|---|---|---|---|
| 1,872,678 | 8/1932 | Chamberlain | 439/696 |
| 3,668,779 | 6/1972 | Turner | 439/736 |
| 4,854,894 | 8/1989 | Harrell | 439/606 |

*Primary Examiner*—Gary F. Paumen

[57] ABSTRACT

An electrical plug with power blades in a power bridge portion and a ground pin in a ground bridge portion, the portions being non-integrally joined.

18 Claims, 2 Drawing Sheets

BRIDGED ELECTRICAL PLUG

Matter enclosed in heavy brackets [ ] appears in the original patent but forms no part of this reissue specification; matter printed in italics indicates the additions made by reissue.

FIELD OF THE INVENTION

This invention relates to electrical plugs, and more particularly to such plugs with a novel bride supporting and separating the power blades from each other, and the ground prong from both.

BACKGROUND OF THE INVENTION

Plugs with two power blades and a ground prong are known in the prior art, as are use in the blades of folded and embossed (for thickening with use of less metal) strips of metal.

SUMMARY OF THE INVENTION

A new plug provides for not only easy and inexpensive automated manufacture, but good insulative qualities as well.

The new plug features an insulative bridge with a power blade bridge portion carrying power blades, a ground bridge portion carrying a ground pin, and with internal means for cooperatively with ends of said power blades anchoring them, the blades being further held in the bridge by a cap closing blade-accepting slots in the bridge. Other features of preferred embodiments will be set forth in the following description and claims.

PREFERRED EMBODIMENT

Following are drawings of a preferred embodiment, with description thereof.

Figure 1:
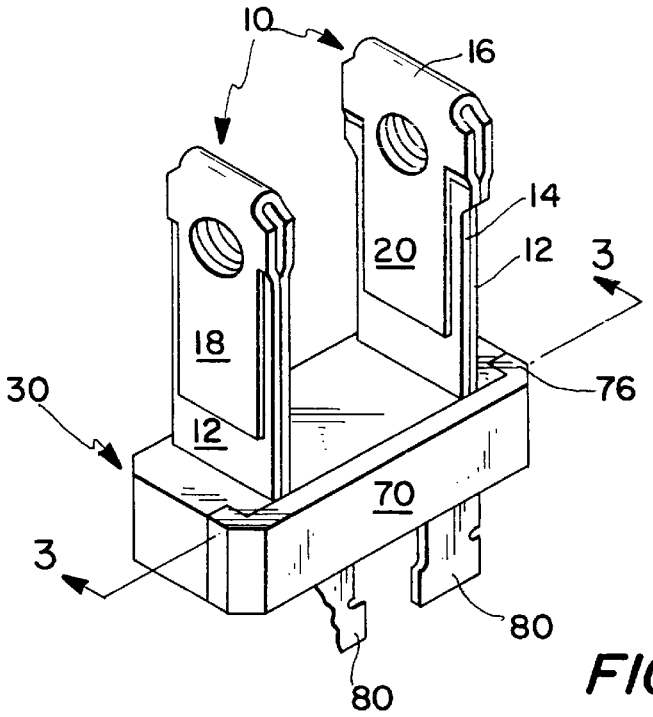
FIG. 1 is an isometric view of a subcombination of that embodiment.
Figure 2:
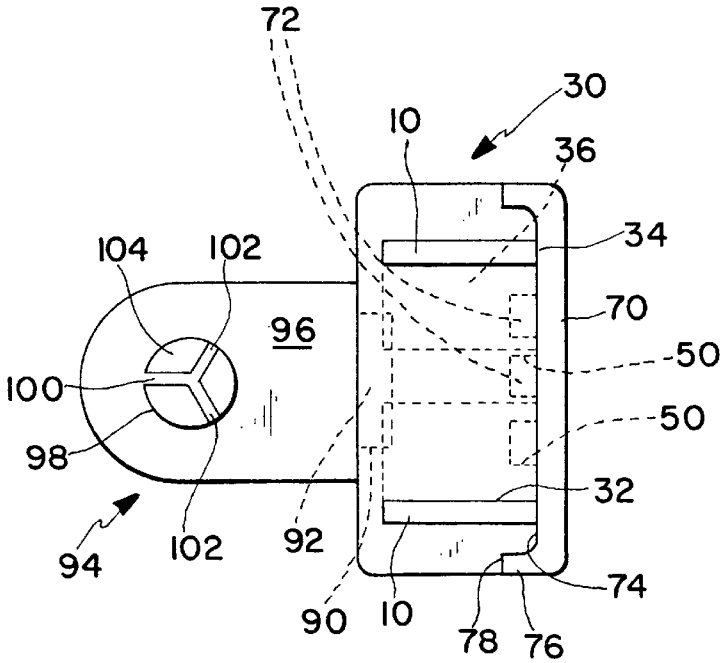
FIG. 2 is a plan view thereof.
Figure 3:
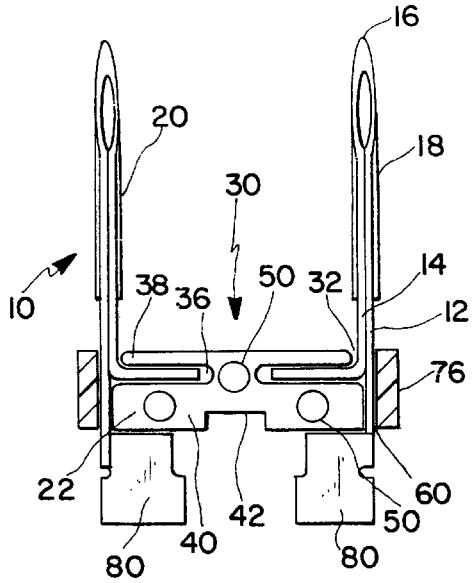
FIG. 3 is a sectional view taken at 3—3 of FIG. 1.

In FIG. 1 are shown a pair of folded conductive metal sheet strip blades indicated generally at 10.

Each blade 10 has an outer layer 12 and an inner layer 14, each pair joined respectively by a fold 16. Each outer layer 12 includes an outwardly facing embossment 18 made by offsetting the corresponding area of the opposing surface of that layer. Each inner layer 14 includes an inwardly facing embossment 20 made by offsetting the corresponding area of the opposing surface of that layer. The effective thickness of each blade 10 (as measurable with, for example, a micrometer caliper) measured through portions 18, 20 is thus more than twice the thickness of the sheet metal of which blades 10 are formed.

All the layers 12, 14 extend into polypropylene power bridge element indicated generally at 30. Element 30 includes a pair of slots 32 extending in an element thickness direction and of a slot size for accepting the double thickness of unembossed layers 12, 14, these slots being open at ends 34. Slots 32 meet within element 30 transversely and longitudinally extending blind slots 36, in which are accepted the bent 90 degree ends of layers 14. Promontories 38 of element 30 define upper surfaces of slots 36, while base 40 defines lower surfaces. Base 40 includes on its outer surface farther away from blade folds 16 a transverse notch 42.

Open from the same transverse side of element 30 as slots 32 and 36 are three blind orienting holes 50.

Lower slots 60 extend transversely and are blind from an open end on the same side of element 30 as slot 32's transversely open end. Slots 60 open into slots 32 and 36.

Secured to bridge element 30 is polypropylene cap 70, which includes orienting projections 72 seated in blind holes 50, and an inner surface 74 which closes off slots 32, 36, and 60.

Outer layers 12 after extending through slots 60 of element 30 terminate in contact paddles 80, each of which is formed from the same metal strip as its respective portion 12 and is continuous therewith, and each of which is rotated 90 degrees about an axis lying approximately along the inner surface of its layer 12 and parallel with the axis of symmetry of power bridge element 30.

Figure 5:
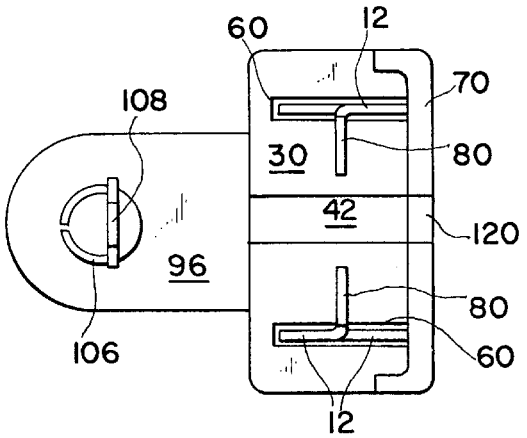
FIG. 5 is a bottom view of said embodiment.

Paddles 80 are bent inwardly of bridge element 30 toward each other, from layers 12, as best shown in FIG. 5.

Blind hole 90 in element 30 has seated therein mating projection 92 integral with the ground bridge, indicated generally at 94.

Figure 4:
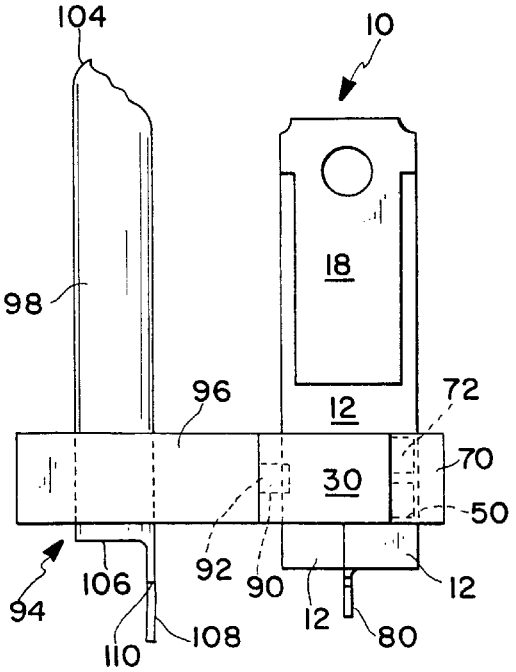
FIG. 4 is a side elevational view thereof.

Ground bridge 94 includes polypropylene support 96 carrying integral projection 92 and ground pin 98 formed of a single sheet of conductive metal, leaving opening 100 between adjoining sheet edges and slots 102 in the upper hemispherical portion 104 of the formed pin 98. At its lower location 106 the there cylindrical pin 98 is cut along the line 106, and (in FIG. 4) the left half-cylinder below line 106 removed, what remains being flattened parallel to the plane going perpendicularly into the paper to provide paddle 108, narrowed from 110 to its extremity.

The elements 70, 30, and 94 are fitted together and thermowelded into a unitary overall bridge assembly. The grooves 42 and 120 (the latter corresponding in depth to the former, and in essence continuing it) provide for vibratory feeding in manufacture. The paddles 80 and 108 may be crimped or welded for electrical connection.

The bent ends of layers 14 cooperate with slots 36 to provide excellent blade anchorage. Integral pins 72 cooperate with blind holes 50 to provide excellent orientations, as do projection 92 and blind slot 90.

The polypropylene of elements 30, 94, 70 provide good insulative qualities.

The new plug also facilitates assembly of wires to the paddles.

Thermowelding of the ground bridge portion to the power bridge portion is preferably done after wires are attached to the appropriate paddles.

What is claimed is:

1. An electrical plug comprising a plastic insulative bridge, said bridge including a ground bridge portion and a power bridge portion, said ground bridge portion being secured to said power bridge portion non-integrally, and in which a single ground pin is held on all sides thereof in said ground bridge portion, and a single pair of power blades are each held on all sides thereof, respectively, in said power bridge portion.

2. The plug of claim 1 in which said power blades each consists of a formed and folded-on-itself strip of conductive sheet metal.

3. An electrical plug comprising a plastic insulative bridge, said bridge including a ground bridge portion and a power bridge portion, said ground bridge portion being non-integrally secured to said power bridge portion, said ground bridge portion holding therein a single ground pin, said power bridge portion holding therein a single pair of power blades in which said power blades each consists of a formed and folded-on-itself strip of conductive sheet metal, and in which a first layer of each said blade extends completely through first slots in said power bridge portion and a second layer of each said blade extends angularly away from said first layer inwardly of said power blade, and is held in second slots of said power bridge portion so angularly related to said first slots.

4. The plug of claim 3 in which said first slots and said second slots are closed by an insulative cap secured to said power bridge portion.

5. The plug of claim 4 in which said ground bridge portion includes an integral elongated projection and said power bridge portion includes a mating blind hole.

6. The plug of claim 4 in which one of said power bridge portion and said cap includes projections and the other includes mating blind holes.

7. The plug of claim 4 in which said power bridge portion includes a vibratory feeder orientation groove.

8. The plug of claim 4 in which each of said power bridge portion and said cap are formed of plastic and secured together.

9. The plug of claim 8 in which said plastic is polypropylene.

10. The plug of claim 8 in which said power bridge portion and said cap are thermoweldedly joined.

11. The plug of claim 10 in which said power bridge portion and said ground bridge portion are thermoweldedly joined.

*12. An electrical plug comprising a plastic insulative power bridge portion and a pair of power blades held therein,*

*each of said power blades consisting of a formed and folded-on-itself strip of conductive sheet metal, and*

*in which a first layer of each said blade extends completely through first slots in said power bridge portion and a second layer of each said blade extends angularly away from said first layer inwardly of said power blade, and is held in second slots of said power bridge portion so angularly related to said first slots, and in which each said first layer extends also completely through a third slot in said power bridge portion, said third slot being thinner than said first slot, each said second slot communicating with each said first slot inwardly of each said third slot.*

*13. The plug of claim 12 in which said first slots and said second slots are closed by an insulative cap secured to said power bridge portion.*

*14. The plug of claim 13 in which one of said power bridge portion and said cap includes projections and the other includes mating blind holes.*

*15. The plug of claim 13 in which said power bridge portion includes a vibratory feeder orientation groove.*

*16. The plug of claim 13 in which each of said power bridge portion and said cap are formed of plastic and secured together.*

*17. The plug of claim 16 in which said plastic is polypropylene.*

*18. The plug of claim 16 in which said power bridge portion and said cap are thermoweldedly joined.*

* * * * *